(12) United States Patent
Haug

(10) Patent No.: US 10,040,672 B2
(45) Date of Patent: Aug. 7, 2018

(54) TRANSMITTING/RECEIVING DEVICE

(71) Applicant: Thomas Haug, Birkenfeld (DE)

(72) Inventor: Thomas Haug, Birkenfeld (DE)

( * ) Notice: Subject to any disclaimer, the term of this patent is extended or adjusted under 35 U.S.C. 154(b) by 29 days.

(21) Appl. No.: 14/914,097

(22) PCT Filed: Jan. 27, 2015

(86) PCT No.: PCT/EP2015/000145
§ 371 (c)(1),
(2) Date: Dec. 1, 2016

(87) PCT Pub. No.: WO2015/113754
PCT Pub. Date: Aug. 6, 2015

(65) Prior Publication Data
US 2017/0073198 A1    Mar. 16, 2017

(30) Foreign Application Priority Data
Jan. 30, 2014   (DE) .................... 20 2014 000 753 U

(51) Int. Cl.
*B66C 13/56* (2006.01)
*B66F 9/075* (2006.01)
(Continued)

(52) U.S. Cl.
CPC .......... *B66C 13/56* (2013.01); *B66F 9/07581* (2013.01); *E02F 9/2004* (2013.01);
(Continued)

(58) Field of Classification Search
CPC .... B66C 13/56; B66F 9/07581; E02F 9/2004; H01H 9/0214; H01H 25/04; H04B 1/40;
(Continued)

(56) References Cited

U.S. PATENT DOCUMENTS 8,161,631 B1 *  4/2012  Ledbetter ................. H02B 3/00
                                                     200/50.21
8,325,078 B1    12/2012 Ledbetter et al.

FOREIGN PATENT DOCUMENTS

DE            829005         1/1952
DE      20 2006 017 127     3/2008
(Continued)

OTHER PUBLICATIONS

Enrange MLIX2 Bellybox Transmitter, Canada, Mar. 16, 2012, pp. 1-2, http://web.archive.org/web/20120316210123/http://www.proportionalradiocontrols.com/pdf/Enrange-MLTX2-Belly-Box-Brochure.pdf.

(Continued)

*Primary Examiner* — Ali Neyzari
(74) *Attorney, Agent, or Firm* — Browdy and Neimark, PLLC

(57) ABSTRACT

A portable transmitting/receiving device, in particular in the form a remote control device for lifting and industrial devices, has a housing that has a receiving portion for accommodating an electronic controller and for mounting at least one operating element (such as a joystick, switch, regulator, or touchscreen with virtual operating elements). Additionally, the housing extends in the vertical direction from a lower-face base contour to an upper-face terminating contour and is perpendicularly delimited by a lateral contour. At least a substantial part of the housing is made of a molded housing part made of an elastomer, the molded housing part forming at least the upper-face terminating contour and the lateral contour. The molded housing part forms a basin that delimits the receiving area and that has a circumferential wall that is completely made of an elastomer and that has a closable opening.

16 Claims, 2 Drawing Sheets

(51) Int. Cl.
| | |
|---|---|
| *E02F 9/20* | (2006.01) |
| *H01H 9/02* | (2006.01) |
| *H04B 1/03* | (2006.01) |
| *G08C 17/00* | (2006.01) |
| *G08C 17/02* | (2006.01) |
| *H01H 25/04* | (2006.01) |
| *H04B 1/40* | (2015.01) |

(52) U.S. Cl.
CPC .............. *G08C 17/00* (2013.01); *G08C 17/02* (2013.01); *H01H 9/0214* (2013.01); *H01H 25/04* (2013.01); *H04B 1/03* (2013.01); *H04B 1/40* (2013.01)

(58) Field of Classification Search
CPC .......... H04B 1/03; G08C 17/02; G08C 17/00; H02B 3/00
USPC .......................................... 340/12.5; 341/176
See application file for complete search history.

(56) References Cited

FOREIGN PATENT DOCUMENTS

| | | |
|---|---|---|
| GB | 2 227 364 | 7/1990 |
| WO | 2005/033822 | 4/2005 |
| WO | 2006/036115 | 4/2006 |
| WO | 2008/055480 | 5/2008 |
| WO | 2009/155929 | 12/2009 |

OTHER PUBLICATIONS

L Series Industrial Wireless Radio Remote Control System, pp. 1-2, Control Chief Wireless Solutions, www.controlchief.com, May 2010.
REM Radio Control—PAIL, Italy, Jul. 15, 2011, http://web.archive.org/web/20110715010903/http://www.remdevice.com/pdf/Folder-tedesco_.pdf, pp. 1-2.

* cited by examiner

TRANSMITTING/RECEIVING DEVICE

BACKGROUND OF THE INVENTION

The invention relates to a portable and in particular a wireless transmitting/receiving device, that is a device by which at least signals can be transmitted and preferably be received as well, such as in particular a remote control device for lifting and industrial devices, according to the generic term of claim 1. Said device has a housing which provides for a receiving portion for accommodating an electronic controller and which serves to mount at least one operating element such as a joystick, switch, regulator or touchscreen with virtual operating elements or a display. The housing extends in the vertical direction from a lower-face base contour to an upper-face terminating contour, in relation to the alignment of the transmitting/receiving device when used as intended. Additionally, the housing is perpendicularly delimited by a lateral contour. At least a substantial part, i.e. in particular a primary part, of the housing is formed by a molded housing part made of elastomer which forms at least the upper-face terminating contour and the lateral contour in relation to an overall profile, the lateral contour in particular continuously extending from the base contour to the upper-face terminating contour and the upper-face terminating contour between two sides of the housing pointing away from each other. As a result of both the upper-face terminating contour and the lateral contour being made of elastomer, the housing is protected against mechanical stress which could act on the transmitting/receiving device from the upper surface or in one of the horizontal directions and which is likely to occur in particular on construction sites or in industrial facilities.

Such operating devices have been in use for years and are employed for the remote control of cranes on construction sites, for example. The housing commonly is a box-shaped construct with handles attached to it and which are held either directly by the operator's hands or by a harness. The harness permits the operator to hold the operating device in front of his body so that he will have both hands free to operate two joysticks, for example. Furthermore, such transmitting/receiving devices frequently have rubber linings in certain areas which are intended to ensure a better grip in particular in the designated grip areas and to provide for a better protection of the device against mechanical stress.

DE 829 005 describes a control handle for lifting gear which is hanging on a cable. The control handle has a dumbbell-shaped housing the surface of which is made completely of rubber in order to avoid any damages of the device or injury to the operator.

WO 2009/155929 A1 describes a control handle for lifting devices in hospitals the housing of which may be made of a thermoplastic elastomer. The control handle has several operating keys on one upper surface of the housing and three engaging elements on one lower surface pointing away from it to allow for safe holding of the control handle.

The disadvantage of the known transmitting/receiving devices is that in general the rubber linings result in additional manufacturing costs as the relevant components additionally need to be provided with such linings during their manufacture or that the requested rubber linings need to be fitted subsequently to the ready-made transmitting/receiving device. The higher the intended degree of the grip and/or the protection of the respective transmitting/receiving device, the more additional costs will have to be incurred regarding the manufacture of the rubber linings. For example, transmitting/receiving devices such as, for example, telephones are known which are intended in particular for outdoor use and therefore have a plastic housing which is made of a rigid plastic on the inside and an elastomer layer on the outside. The manufacture of such two-component plastics in turn results in relatively high overall manufacturing costs of the transmitting/receiving device.

BRIEF SUMMARY OF THE INVENTION

The invention's purpose is to avoid the specified disadvantages in a class-specific transmitting/receiving device and to ensure extensive protection, if possible, against mechanical action and a good grip of the transmitting/receiving device in a simple manner.

This purpose is solved by providing a transmitting/receiving device showing the features according to claim 1. The molded housing part forms a basin delimiting the receiving area with a closable opening. The basin forms a circumferential wall in the horizontal direction which is formed completely by the molded housing part made of rubber or any other elastomer which allows for effective protection of the electronic controller arranged in the receiving area. Hereby the electrical/electronic parts accommodated in the receiving area can be protected particularly well against impact and moisture entering the area. Additionally, a transmitting/receiving device formed by a telephone, for example, allows for easy assembly since all electronic components simply need to be put into the molded housing part and the surface can be closed, for example, by the respective control panel or the touchscreen.

Thereby at least the lateral contour is formed on all horizontal sides of the housing. Thus a housing with a box-shaped receiving area has four lateral contours that are in particular continuously extending and can thus provide for effective protection of the receiving area against mechanical stress in all four horizontal directions. The housing part forming the receiving area can thereby be formed completely by the molded housing part.

The upper-face terminating contour and the lateral contour are preferably formed by an integrally molded part of the molded housing part. Thereby the transmitting/receiving device can be fully assembled by simple equipping of the housing formed substantially by the molded housing part, thus reducing the overall manufacturing costs for the transmitting/receiving device as well. Additionally, the molded housing part can thereby be formed in a particularly stable manner in order to allow for an even better protection against mechanical stress to the transmitting/receiving device.

Advantageously, the molded housing part is made of a uniform elastomer material thus allowing for the production costs of the transmitting/receiving device to be kept relatively low despite the extensive rubber lining.

Furthermore, it is advantageous if, for example, a shaft-like rechargeable battery compartment is embedded in the circumferential wall. By thus integrating the rechargeable battery receiving area in the molded housing part made of elastomer said receiving area can be sealed particularly well and can provide effective protection against moisture for a battery cell or rechargeable battery received herein.

Furthermore, it is advantageous if a sealable routing path is embedded in the molded housing part between the rechargeable battery compartment and the receiving area along which connecting cables can be laid from the rechargeable power pack received in the rechargeable battery compartment to the electronic controller, for example.

In a particularly advantageous embodiment the molded housing part made of elastomer additionally forms the base contour which extends in particular continuously between two sides of the housing pointing away from each other. Thus the housing is additionally protected against mechanical stress on its lower surface which is likely to occur in particular on construction sites or in industrial facilities. Thereby the housing made of elastomer towards all sides and preferably made in one piece is a particularly good impact protection since the shock generated upon impact can be absorbed in any case by the elastomer regardless of the direction in which the transmitting/receiving device impacts. Moreover, the housing provides for increased grip on all sides and is secured against slipping off when deposited, for example.

It is advantageous if the molded housing part made of elastomer forms a base plate delimiting the receiving area at the bottom so that the electrical/electronic parts accommodated in the receiving area can be protected particularly well against moisture entering from the bottom.

As an alternative, it is advantageous if the molded housing part made of elastomer forms an additional bearing plate delimiting the receiving area at the upper surface, which for this purpose is manufactured in appropriate thicknesses or with additional reinforcing ribs in order to provide for sufficient flexural rigidity. Thereby the receiving area can be protected particularly well against moisture entering from the top such as may be case with precipitations in the outdoor area, for example.

It is advantageous if the upper-face terminating contour protrudes in the vertical direction beyond the at least one operating element. Thereby the operating elements attached to the upper surface of the housing such as joysticks, for example, can be protected against any mechanical impact that may occur, for example, when the transmitting/receiving device falls down.

Advantageously, the upper-face terminating contour is formed by a handle arrangement of the molded housing part. Thus this part of the molded housing part may also serve as a handle element which can be held comfortably, apart from its protective function.

It is furthermore advantageous if the handle arrangement extends circumferentially, thus allowing for a particularly effective protection of the operating elements on one hand and whereby the handle arrangement allows for particularly many handle positions and various potential applications.

Advantageously, the base contour forms at least one steady contact area by means of which the transmitting/receiving device can be deposited. For this purpose, a peripheral edge serving as a contact area or several contact areas which are set apart from each other may be designated which define a deposit plane which in turn specifies a predefined standing position of the transmitting/receiving device in relation to a ground.

In another advantageous embodiment the molded housing part has accommodated at least one rigid plate which may serve to additionally brace the housing. Thus the transmitting/receiving device may be braced within the base body, as required, in order to allow for a backlash-free connection or mounting of certain components, for example.

It is advantageous, for example, if one first rigid plate is formed by a mounting plate to which the at least one operating element is mounted pivotably. Thus simple and zero-clearance assembling of operating elements to the housing such as joysticks is possible, for example.

Furthermore, it is advantageous if a second rigid plate is formed by a base plate which delimits the receiving area to the bottom. Thus the components accommodated in the receiving area can be protected against external forces and the housing can be braced on the bottom.

Additionally, the elastomer is preferably formed by a thermoplastic elastomer thus allowing for a particularly varied and precise design during manufacture of the molded housing part.

DETAILED DESCRIPTION OF THE INVENTION

Figure 1:
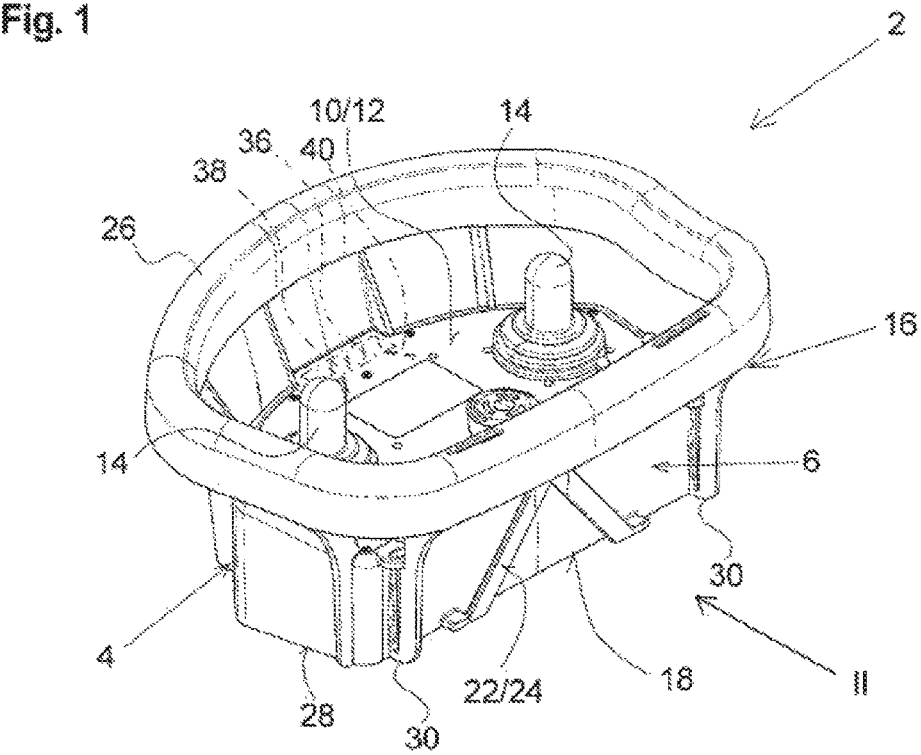
FIG. 1 a perspective view of an inventive transmitting/receiving device.
Figure 2:
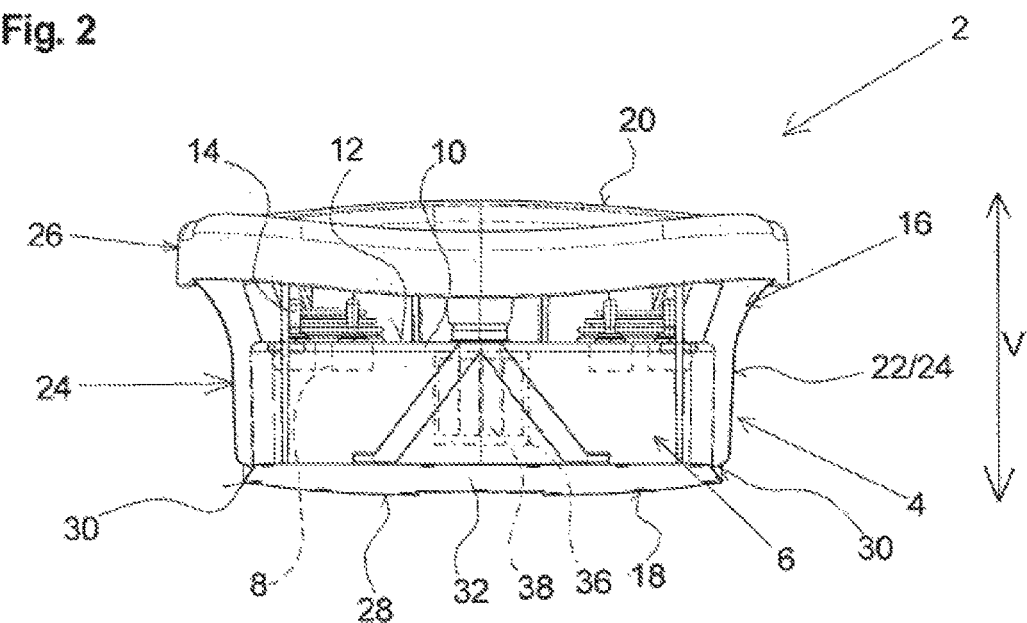
FIG. 2 a lateral view of the transmitting/receiving device towards II From FIG. 1 and FIG. 3 a perspective exploded view of the remote control device according to FIG. 1.
Figure 3:
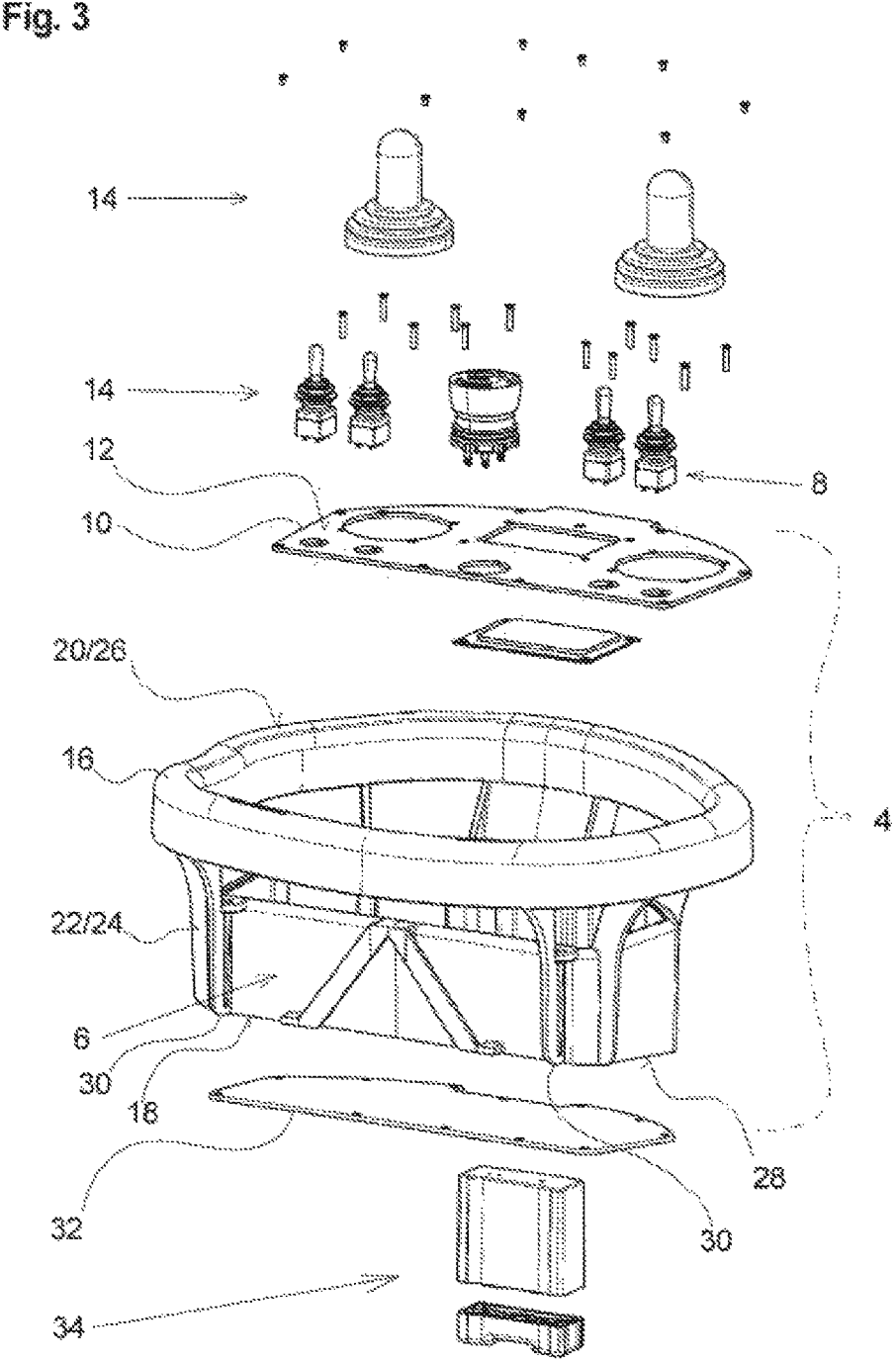

FIGS. 1 to 3 depict a wireless transmitting/receiving device 2, such as for example for a crane, which has a housing 4. The housing 4 forms a box-shaped receiving area 6 serving to accommodate electrical and electronic components 8 in an electronic controller, as illustrated by broken lines in FIG. 2. In addition, there are several operating elements 14 mounted on a bearing plate 10 comprising among others two joysticks and which forms an upper surface 12 of the housing 4.

The box-shaped receiving area 6 is substantially delimited or formed by a molded housing part 16 of the housing 4 which is made in one piece and of a thermoplastic elastomer. Relative to the alignment to be taken up under normal use of the transmitting/receiving device 2 in the vertical direction V said housing forms both a continuous lower-face base contour 18 and a continuous upper-face terminating contour 20. In addition, the molded housing part 16 is perpendicularly forming a continuous lateral contour 22 extending in all horizontal directions which is formed by a circumferential wall 24 extending at the height of the receiving area 6.

Thus the respective outermost areas of the transmitting/receiving device 2 are effectively formed in all spatial directions by the elastic molded housing part 16.

The upper-face terminating contour 20 is formed by a circumferential ring-shaped handle arrangement 26 extending at the upper end of the transmitting/receiving device 2. The handle arrangement 26 relative to the operating elements 14 is such that it protrudes beyond said elements and in particular beyond the two joysticks in the vertical direction and that the axes of the unactuated joysticks and a virtual plane clamped by the circumferential handle arrangement 26 intersect.

The lower-face base contour 18 is formed by a peripheral edge 28 of the molded housing part 16 and at the corners it forms contact areas 30 which are set apart from each other by means of which the transmitting/receiving device 2 may be deposited on a ground in a defined alignment (not illustrated). Embedded in the edge 28 is a rigid removable base plate 32 which closes the receiving area 6 to the bottom. The electrical and electronic components 8 accommodated in the receiving area 6 may be accessed through said receiving area, as required.

As an alternative to the illustrated embodiment the upper-face mounting plate 10 or the base plate 32 may be integrated in the molded housing part 16 made of elastomer. The mounting plate 10 or base plate 32 thus made of elastomer as well may be provided with additional reinforcement ribs, for example, in order to ensure the respective necessary flexural rigidity. Thereby the molded housing part 16 forms a basin-like part in addition to the handle arrangement 26 which delimits the receiving area 6 and which has either an upper-face or lower-face opening depending on the embodiment (not illustrated).

The housing 4 may thus be formed completely of the one-piece molded housing part 16 and made of elastomer except for the element necessary to close the opening. The opening can then be closed by attaching the mounting plate 10 or the base plate 32, for example, which may advantageously be made of elastomer as well.

Furthermore, as an alternative to the illustrated embodiment which provides for a rechargeable battery receiving area 34 which is separately formed for and accommodated in the receiving area 6 (refer to FIG. 3), a rechargeable battery compartment 36 which is integrated in the molded housing part 16 may be provided for in which a rechargeable battery pack 38 may be received, for example, as illustrated by dot-and-dash lines in FIGS. 1 and 2. In order to be able to connect the rechargeable battery pack 38 to the electrical/electronic elements 8 accommodated in the receiving area 6 additional slot-like routing paths 40 are embedded in the upper surface 12 in which connection cables may be run, for example. Subsequently a sealant may be applied to the routing paths 40 in order to seal both the receiving area 6 and the rechargeable battery compartment 36 towards the outside.

The invention claimed is:

1. A portable transmitting/receiving device, in particular in form of a wireless remote control device comprising:
    a housing which has a receiving portion for accommodating an electronic controller and for mounting at least one operating element and
    which extends in a vertical direction from a lower-face base contour to an upper-face terminating contour and is perpendicularly delimited by a lateral contour,
    a substantial part of the housing being made of a molded housing part forming at least the upper-face terminating contour and the lateral contour,
    characterized in that the molded housing part forms a basin which delimits the receiving portion and which has a circumferential wall that is completely made of an elastomer and which has a closable opening.

2. A transmitting/receiving device according to claim 1, characterized in that the upper-face terminating contour and the lateral contour are formed by an integrally molded part of the molded housing part.

3. A transmitting/receiving device according to claim 1, characterized in that the molded housing part is made of a uniform elastomer material.

4. A transmitting/receiving device according to claim 1, characterized in that a rechargeable battery compartment is embedded in the circumferential wall.

5. A transmitting/receiving device according to claim 4, characterized in that a sealable routing path is embedded in the molded housing part between the rechargeable battery compartment and the receiving portion.

6. A transmitting/receiving device according to claim 1, characterized in that the molded housing part made of elastomer additionally forms the base contour.

7. A transmitting/receiving device according to claim 1, characterized in that the molded housing part made of elastomer forms a base plate delimiting the receiving portion at the bottom.

8. A transmitting/receiving device according to claim 1, characterized in that the molded housing part made of elastomer forms a mounting plate delimiting the receiving portion at the top.

9. A transmitting/receiving device according to claim 1, characterized in that the upper-face terminating contour protrudes in the vertical direction beyond the at least one operating element.

10. A transmitting/receiving device according to claim 1, characterized in that the upper-face terminating contour is formed by a handle arrangement of the molded housing part.

11. A transmitting/receiving device according to claim 10, characterized in that the handle arrangement is formed circumferentially.

12. A transmitting/receiving device according to claim 1, characterized in that the base contour forms at least one steady contact area by means of which the transmitting/receiving device may be deposited.

13. A transmitting/receiving device according to claim 1, characterized in that the molded housing part accommodates at least one rigid plate for bracing the housing.

14. A transmitting/receiving device according to claim 13, characterized in that one first rigid plate is formed by a mounting plate to which the at least one operating element is mounted pivotably.

15. A transmitting/receiving device according to claim 13, characterized in that a second rigid plate is formed by a base plate delimiting the receiving portion at the bottom.

16. A transmitting/receiving device according to claim 1, characterized in that the elastomer is made of a thermoplastic elastomer.

* * * * *